United States Patent [19]
Patterson et al.

[11] Patent Number: 5,967,294
[45] Date of Patent: Oct. 19, 1999

[54] HIGH STROKE, HIGHLY DAMPED SPRING SYSTEM FOR USE WITH VIBRATORY FEEDERS

[75] Inventors: Harold E. Patterson; Brian V. McIntyre, both of Indiana, Pa.

[73] Assignee: FMC Corporation, Chicago, Ill.

[21] Appl. No.: 08/842,372

[22] Filed: Apr. 23, 1997

[51] Int. Cl.$^6$ .................................................. B65G 27/08
[52] U.S. Cl. .......................... 198/763; 198/760; 198/769
[58] Field of Search ................................. 198/769, 760, 198/763

[56] References Cited

U.S. PATENT DOCUMENTS

| | | | |
|---|---|---|---|
| 3,216,556 | 11/1965 | Burgess | 198/220 |
| 4,260,052 | 4/1981 | Brown | 198/763 |
| 4,356,911 | 11/1982 | Brown | 198/766 |

OTHER PUBLICATIONS

FMC Corporation, *Syntron BF–4 Scale Feeder*, Not Dated, 2 pages, Homer City, PA.
FMC Corporation, *Syntron Light–Capacity Electronic Vibrating Feeders*, 1994, 20 pages, U.S.A.

*Primary Examiner*—William E. Terrell
*Assistant Examiner*—Khoi H. Tran
*Attorney, Agent, or Firm*—Rockey, Milnamow & Katz, Ltd.

[57] ABSTRACT

A vibratory conveying feeder includes a trough mounted by springs to a base with a vibratory driver bonded to the base and connected to the trough. The springs include a first vertically oriented spring at a front of the conveyor connected between the base and the trough and a second spring arranged between the trough and the base and arranged along a line about 20° to the horizontal. The second spring is set between 40% to 80% of total spring rate. The base is tapered toward a rear side thereof to allow a plurality of such conveyor feeders to be mounted in a tight circle for delivering material radially outwardly of the center line of the circle in a weighing and distributing operation.

22 Claims, 4 Drawing Sheets

1

HIGH STROKE, HIGHLY DAMPED SPRING SYSTEM FOR USE WITH VIBRATORY FEEDERS

FIELD OF THE INVENTION

The present invention relates to vibratory feeders and particularly to two mass electromagnetic vibratory feeders for conveying materials.

BACKGROUND OF THE INVENTION

Many applications for vibratory feeders require high conveying feed rates. Feed rates on a vibratory feeder is a function of the operating frequency (number of vibration cycles per second), stroke (displacement magnitude) of the conveying surface, and the stroke angle with respect to a horizontal reference plane.

In a two-mass, electromagnetic vibratory feeder a longitudinal conveying member, the trough, is usually disposed above a base member and connected to the base member by means of a system of springs. The springs are connected to the trough and base members on an angle, such that the spring connection of the trough would be displaced a distance from a vertical reference that passes through the center of the spring connection on the base member. An armature of an electromagnet is connected to one of the base or trough members, usually the trough, and the electromagnet core and coil is connected to the other. The base member is usually isolated from its support structure by coil springs, or elastomer springs to minimize unwanted forces from being transmitted into the support, and surrounding structures.

When an electric current is caused to flow through the magnet, the armature and magnet pole faces are mutually attracted to each other, causing the springs to deflect, and displacing the trough and base from their rest position. When the current is removed, the magnet releases, and the energy stored in the spring system by deflection, causes the trough and base to return to their rest positions to a deflection in an opposite direction to a maximum position where the trough and base will once again change directions toward the rest position. If the current is then reapplied, the process is repeated. If the current is turned on and off at a uniform rate, the trough and base will be reflected at that rate, or frequency.

Typically, electromagnetic driven vibratory feeders are operated at a frequency determined by the power line frequency, or at half of the power line frequency by use of a diode rectifier, or by use of a permanent magnet as part of the electromagnetic drive system. Examples of such feeders are those manufactured by FMC Corporation of Homer City, Pa., under the trade name SYNTRON. In such feeders, the frequency is fixed at 120 Hz or 60 Hz in North America, and 100 Hz or 50 Hz (usually 50 Hz) in most other countries of Europe or Asia. Since the frequency at which these feeders operate is fixed, only the stroke and stroke angle can typically be adjusted to optimize the feed rate. The stroke magnitude of these feeders is constrained by the amount of magnetic force available to deflect the spring system, and ultimately by the stress limitations of the spring system and the structural members of the feeder.

The two-mass feeder takes advantage of the natural amplification of the stroke due to resonance, by adjusting the natural frequency of the mass/spring system to be close to that of the operating frequency. This assures that there will be sufficient power available to operate the feeder with a reasonably sized electromagnetic. Typical maximum stroke values for these feeders operating at 60 Hz. is 0.0625 inches to about 0.1 inches, and at 50 Hz., is about 0.09 inches to about 0.144 inches.

The equation for acceleration of the trough, assuming sinusoidal motion may be stated as:

Eq. #1 $a_t = N^2 A_t / 70400$ where $A_t$=the acceleration of the trough along the linear drive line;

N=the operating frequency in cycles per minute;

$A_6$=the stroke of the trough in inches;

and 70400 is a constant derived from equation simplification, and conversion to the unit measure value as shown above.

For the trough strokes and frequencies given, the accelerations at both 60 Hz. and 50 Hz. range from 11.5 g's., to 18 g's. As can be seen, the acceleration is heavily influenced by the operating frequency, because the acceleration varies with the square of a change in frequencies, but varies only proportionally to a change in stroke.

As previously stated, feed rate is also dependent on the angle at which the acceleration is applied to the trough member of the feeder. As the trough is linearly accelerated along a path defined by the spring angle, any point on the trough is therefore subjected to both a horizontal and a vertical component of the acceleration. The vertical component, again assuming sinusoidal motion, may be expressed as:

Eq. #2 $a_v = a_t \sin(\alpha)$ where $a_v$=the vertical component of the trough acceleration $a_t$ in g's;

$\alpha$=the spring angle.

As the trough is accelerated, a particle resting on the trough surface would be accelerated with the trough, and at a point where the vertical acceleration on the particle exceeds −1 g, the particle would separate from the trough's surface, taking flight. The particle, by force of gravity would return to the trough surface displaced at some distance from where it took flight, depending on the amount of acceleration and the angle at which it was applied. Starting with a spring angle of 0°, the feed rate would, for practical purposes, also be at 0, as only the horizontal component of the trough acceleration would be present. As the spring angle increases, the feed rate also increases, until the optimum feed rate for that combination of frequency, stroke and spring angle is reached. At some angle, the feed rate would start to decrease again, and will continue to decrease as the spring angle decreases, with violent bouncing of the material being conveyed as the spring angle approaches 90°.

If the particles separated from the trough returns to be in contact with the trough within the same vibration cycle, but at a point on the trough acceleration curve where the particle can be again accelerated to the same level as the previous cycle, it is referred to as the "first stable feed zone". Likewise, if the particle leaves the trough, and comes back in contact with the trough in the next vibration cycle, again at a point on the trough acceleration curve where it can stabilize, it would be referred to as conveying in the "second stable feed zone", and so on for particles landing in three or four vibration cycles. There exists between these stable feed zones acceleration regions where the particle cannot be uniformly accelerated between landings. In these unstable zones, feed rate is indeterminate by calculation, but the net result in practice is a decrease from the feed rate obtained just prior to the unstable zone.

While very high feed rates can be realized from operation in the higher stable feed zones, there are practical reasons that make such operation difficult. These regions are very sensitive, because small changes in feed angle, stroke, surface friction, etc., can result in major changes to the feed rate, for example. Also, at the acceleration levels involved, it would be difficult to design structures and spring systems for such high frequency electromagnetic equipment, and have the structures and spring systems survive the stress levels involved. For these reasons, electromagnetic feeders are usually limited to operation in the first or second stable feed zones.

Another concern of operating a feeder in higher acceleration regions is the possible damage to the material being conveyed from high impact speed between the material particles and the trough surface, as material particles, accelerated by gravity, land back on the trough after flight. As an accelerated particle separates from the trough surface in flight, depending on its acceleration and hence its flight time, it may land back on the trough surface such that velocity of the trough adds to the velocity of the particle when they collide, resulting in a high impact force. It is necessary, therefore, to choose combinations of frequency, stroke and feed angle that minimizes impact speed without sacrificing too much feed rate. In the case where the frequency is fixed and the stroke is controllable, it is important to select a feed angle that results in the best compromise between impact speed and feed rate. Often concerns about product damage from high impact collisions between the material and the trough preclude operation in the second and higher feed zones.

In order to have uniform rate along the entire length of the trough member of the feeder, it is advantageous that the feed angle and stroke be uniform along the entire length of the trough member, as well. In order to accomplish this, it has been suggested that the drive force could be applied along a linear, angular path, such that it passes through the center of gravities of the base mass, trough mass, and the effective center of gravity of the system as a whole. By so aligning the drive force, in theory, the trough and base masses would not generate inertial forces about their respective mass centers to form a force couple that would cause the feeder to rotate or to pitch longitudinally on its isolation system.

In practice, it is difficult to align the center of gravities because of the constraints imposed by the geometry of the feeder and its installation constraints. Balancing weights would be required to mount onto the base or trough, as the case may be, to align the center of gravities. The balancing weights add unwanted mass to the feeder, add to cost, and detract from its performance. Often, as in the case of small feeders used to feed product to vertical weigh scales, it would be virtually impossible to dynamically balance the feeder, because the space limitations of the scale require a feeder with an extremely short base.

Prior patents such as U.S. Pat. Nos. 3,216,556, 4,260,052 and 4,356,911 describe methods and apparatus to compensate for the dynamic inertial force couple. These devices compensate by independently adjusting the feeder spring angles relative to one another, such that they cause a rotation of the trough that opposes the rotation caused by the inertial force couple. With this method, however, it is difficult to adjust the spring angles correctly to achieve uniform motion, and each individual feeder manufacturer requires its own unique adjustment. This requirement for adjustment adds considerable cost to manufacturing, making it difficult to compete in a high volume, low cost market. Also, the adjustable spring angle feature places geometric restraints on the feeder design, such as a minimum length requirement, making it difficult to be adapted for use in a weigh scale feeder. For a weigh scale feeder it is important to be able to reduce the size of the feeder, advantageous because such would enable the scale manufacturer to reduce the height and overall size of the equipment, making such equipment more cost effective.

Another problem often encountered in applying electromagnetic feeders, particularly where a high stroke feeder is required to start and stop frequently, is that material continues to feed for an instant after the electric power is removed from the feeder magnet. This phenomena is known as "coasting", and is caused by the combination of inertia and low spring system damping, and can be a problem for the user, particularly in a weighing application, where the overfeed can add up in lost material and lost revenue. External damping means can be added to the feeder to reduce the coasting problem, such as adding dash pots and the like, but since dampers use energy, there often is insufficient power to maintain the high stroke required for the desired feed rate while in operation.

Also, another source of overfeeding after shutoff is that due to the angle of repose of the material, if the material is poured from a container onto a surface unconstrained, it will form a conical pile. The angle formed between the base of the pile and its slope, is the angle of repose for that material. If the bed depth of the feed is very deep, as might be required with lower feed rate feeders in order to maintain capacity, and the feeder is stopped, material falls from the discharge lip of the trough until the angle of repose of the material has been reached. Often in the past, mechanical gates have been used to prevent material from discharging due to this phenomenon, but again this adds to increased equipment costs.

Another concern of users of these feeders include the requirement in some applications of a sanitary service type of construction, for example for food as feed material, with few if any places allowable where particles of feed material can collect. Other concerns include: the ease of cleaning the feeder, an effective vibration isolation of the feeder that minimizes any forces being transmitted to the feeder support structure, a low maintenance with easy access to adjustment devices, and a low operating noise level.

It would be desirable to provide a vibratory feeder that advantageously addresses the above concerns and would be useful in meeting the requirements of the vertical and linear weigh scale feeder markets.

These and other objects, features, and advantages of this invention are evident from the following description of a preferred embodiment of this invention, with reference to the accompanying drawings.

SUMMARY OF THE INVENTION

The present invention provides a vibratory feeder which includes a base with a horizontal portion and a rising vertical portion at the rear of the base. The rising vertical portion has a front facing surface which is angled backwardly toward the rear of the base and includes a cavity therein. A trough is mounted over the base and supported by a first vertical spring on one side of the base and a second obliquely arranged spring held within the cavity and extending to the trough at between 10° and 45°, and preferably at about 20° to the horizontal. A vibratory driver such as an electromagnetic vibratory driver is mounted to the base and connected to the trough. In the preferred embodiment the vibratory driver is an electromagnetic driver having a coil assembly mounted within a second cavity in the base and an armature mounted to a trough supporting/spring mounting bracket and having an air gap between the coil assembly and the armature.

According to the invention, the feeder is adjusted such that the resulting dynamic feed angle at the rear of the feeder trough is higher than at a front of the feeder trough, resulting in a slightly lower feed rate at the rear, but at the same time compensating for possible loss of stroke due to the dampening effect of material load on the rear of the trough. This also has the desirable effect that the bed depth of material in the rear of the feeder is deeper than the bed depth at the discharge end where the feed rate is higher. The reduced bed depth reduces the amount of material dribbling off the trough after the feeder has been turned off due to exceeding the angle of repose of the material, which is less of a problem with lower bed depths.

Also, according to the invention, the second spring is set between 40% and 80% of total spring rate, representing a significant portion of that required for the entire feeder, so that a damping coefficient for the feeder is achieved that is more than three times that of some known feeders of the same size and capacity.

Also, by orienting the first spring vertically, any vertical component of spring force is minimized substantially just as that caused by the compensated inertial force couple. This further decreases the unwanted coasting effect.

Other features and advantages of the present invention will be apparent from the following detailed description, the accompanying drawings, and the appended claims.

DETAILED DESCRIPTION OF THE PREFERRED EMBODIMENTS

Figure 1:
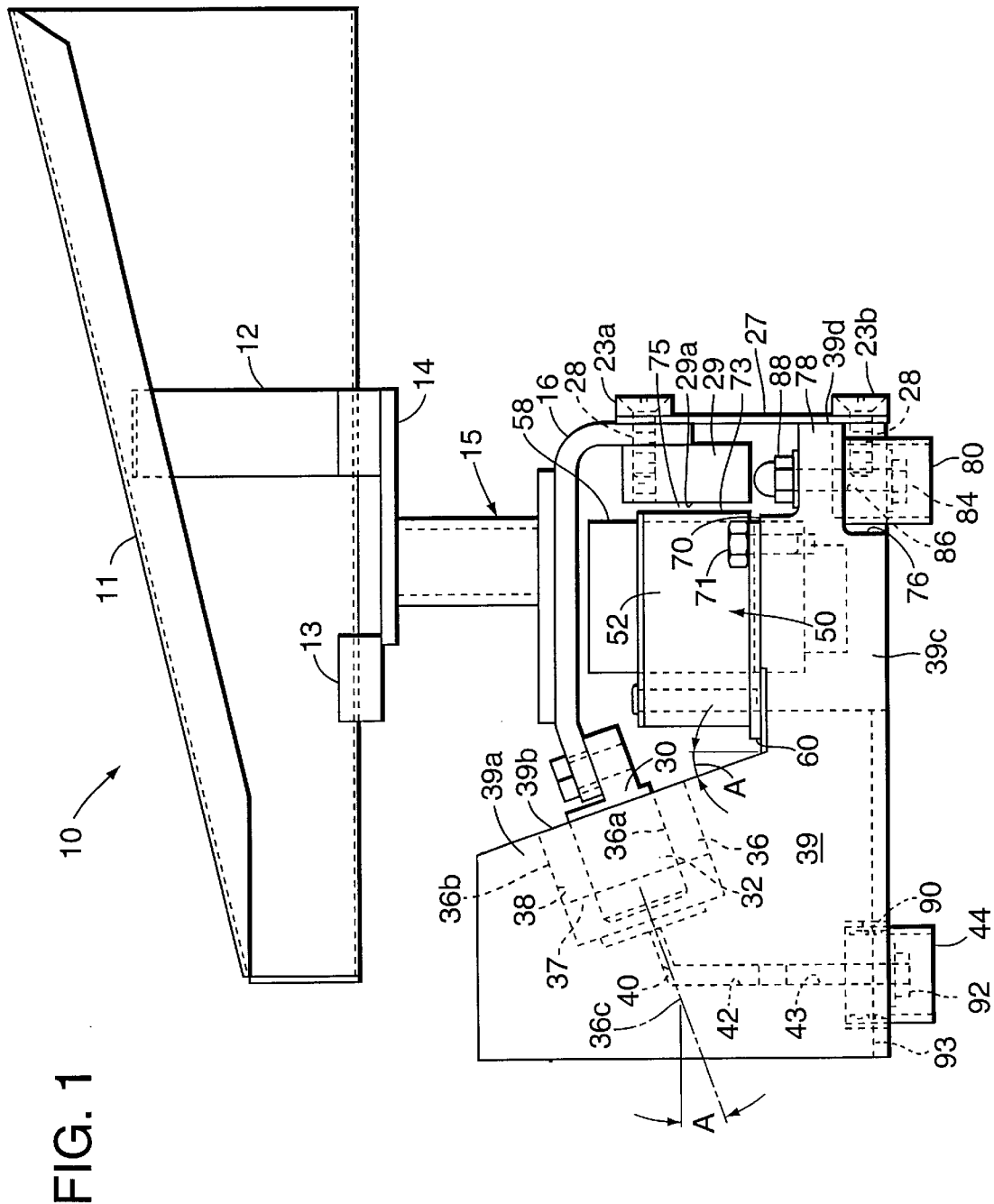
FIG. 1 is a side view of the present invention vibratory feeder with portions removed for clarity.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

FIG. 1 illustrates a two-mass electromagnetic vibratory feeder 10 which embodies the present invention. This vibratory feeder 10 would be particularly useful for weigh scale applications. A trough 11 is supported by ribs 12, 13 which are in turn connected to a mounting bracket 14. The mounting bracket 14 is supported on a mounting pedestal 15. The pedestal 15 is connected to a spring-mounting bracket 16. The pedestal 15 is typically connected to the spring mounting bracket 16 by threaded studs protruding from blind tapped holes extending from the mounting bracket 16 (not shown) and connected to the mounting pedestal 15 with suitable washers and nuts.

The mounting pedestal 15 is used as a means for the weigh scale manufacturer to seal the drive section of the scale feeder from the scale head for sanitary concerns. A circular plate (not shown) having cutouts to receive the mounting pedestal 15 is positioned above the feeder drive. The mounting pedestal 15 protrudes through the cutout and is sealed from below by means of a soft rubber boot (not shown) connected between the mounting pedestal 15 and the circular plate.

The trough 11 is bolted to the mounting pedestal 15 using suitable mounting hardware (not shown). On an outside face of one end of the spring mounting bracket 16, one or more leaf springs 27 are connected by means of a spring clamp bar 23a and a plurality of countersunk Allen-head fasteners 28 which pass through the spring mounting bracket 16 and are threaded into tapped holes of the electromagnet armature 29. The other end of the spring mounting bracket 16 is bent to facilitate its connection to a tab 30 on a hub 32 of an annular elastomer spring assembly 35. The spring assembly 35 also includes an annular elastomer spring element 36 which extends to an annular surface 37 within the cavity 38.

An L-shaped base casting 39 supports the spring mounting bracket 16 via the springs 27,36. The inner surface 36a of spring element 36 is cemented to the hub 32, while its outer surface 36b is cemented into a cavity 38 which is machined into an upstanding leg 39a of the feeder base casting 39, such that its longitudinal axis 36c is perpendicular to the slope of an upper front facing surface 39b of the leg 39a of the feeder base casting 39. The front facing surface 39b of the feeder base casting 39 slopes upward and away from the vertical axis in a direction to the rear of the feeder, such that the angle A formed between this edge and a vertical line is between 10° and 45° and preferably about 20°. Thus, the longitudinal axis 36c is set at between 10° and 45°, and preferably about 20° to the horizontal.

In the center bottom of cavity 38, a hole is drilled to form a channel 40 which in turn is obliquely connected to a further channel 42 formed by drilling a hole extending axially upward through a drilled and tapped mounting hole 43 used to connected to a rear coil spring isolator 44 to the feeder base casting 39. The remaining end of the leaf spring assembly 27 is connected to a bottom leg 39c of the feeder base casting 39, at a lower front face 39b thereof, utilizing a second spring clamp bar 23b and Allen-head fasteners 28.

The magnet core and coil assembly 50, consisting of iron laminations 52, a polyurethane molded and encapsulated coil 58 wound on the laminations, and magnet mounting/adjusting bracket 60, is mounted to the feeder base casting 39. The lower portion of the magnet core and coil assembly 50, is mounted within a through cavity 62 of the feeder base casting bottom leg 39c, and the magnet mounting/adjustment bracket 60 is mounted on the machined flat surfaces 70 formed by the upper longitudinal edges of the through cavity 62. Fasteners 71 pass through slotted holes (not shown) in the magnet mounting/adjustment bracket 60 and are threaded into drilled and tapped holes in the machined flat surface 70 to connect the magnet core and core assembly 50 to the feeder base casting 39. The pole face 73 of the magnet core and coil assembly 50, is aligned to be uniformly parallel with the magnet armature 29 that is mounted to the spring mounting bracket 16, utilizing the slotted holes of the magnet/mounting adjusting bracket 60, and held in place by tightened fasteners 71, thus forming a uniform air gap 75 between the pole face 73 and a face 29a of the magnet armature 29.

Two circular cutouts 76 are machined in the lower front corners of the feeder base casting 39, forming a plate 78 in each corner between the upper surface of the feeder base casting 39, and the top of the cutout. Holes are drilled in the center of each cutout through the plates 78 thus formed. Two front coil spring isolators 80a, 80b are mounted in the cutout 76 of the feeder base casting 39, and connected to the feeder base casting 39 by means of the fasteners 84 passing through the holes 86, and tightened in place using acorn nuts 88.

The rear coil spring isolator 44 is mounted in a recess 90 machined perpendicularly into the rear center of feeder base casting 39, by means of a fastener 92, threaded into the drilled and tapped hole 43 in the center of the recess 90. A slot 93, to position and provide a strain relief means for the electromagnet power cord (not shown), is machined in the bottom of the feeder base casting 39, extending longitudinally from the rear of the feeder base casting 39, to the edge of through cavity 62, where the slot is enlarged in expanding slot 93a to accommodate connection to the magnet coil.

Figure 2:
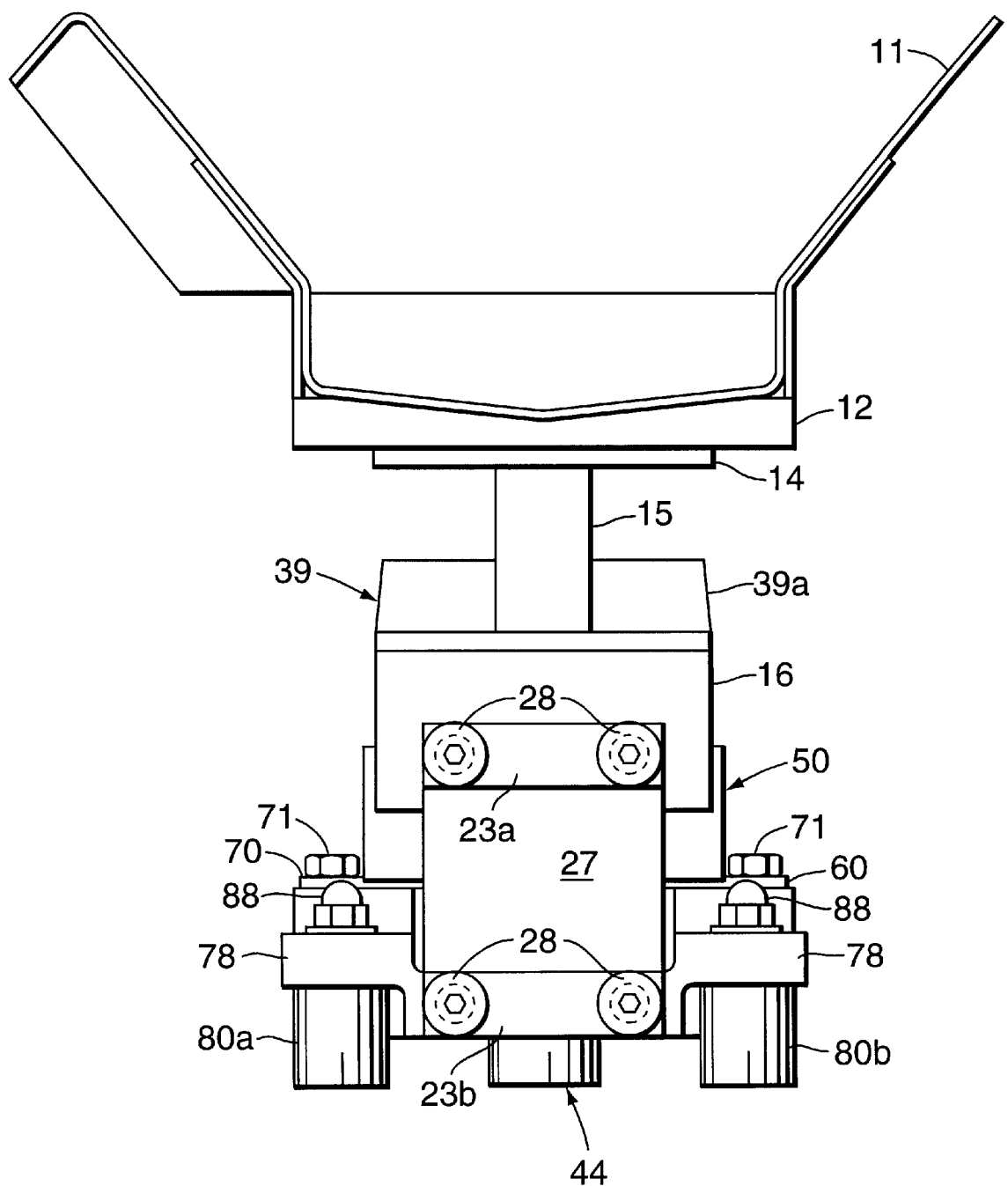
FIG. 2 is a front view of the vibratory feeder shown in FIG. 1.

FIG. 2 illustrates a spring assembly including the spring clamp bars 23a, 23b, the leaf spring 27 and the countersunk fasteners 28. The magnet mounting/adjustment bracket 60 mounted on the machined flat surface 70 with fasteners 71, adjustably connects the magnet core and coil assembly 50 to the feeder base casting 39. The formed plates 78 are more easily envisioned in this view.

Figure 3:
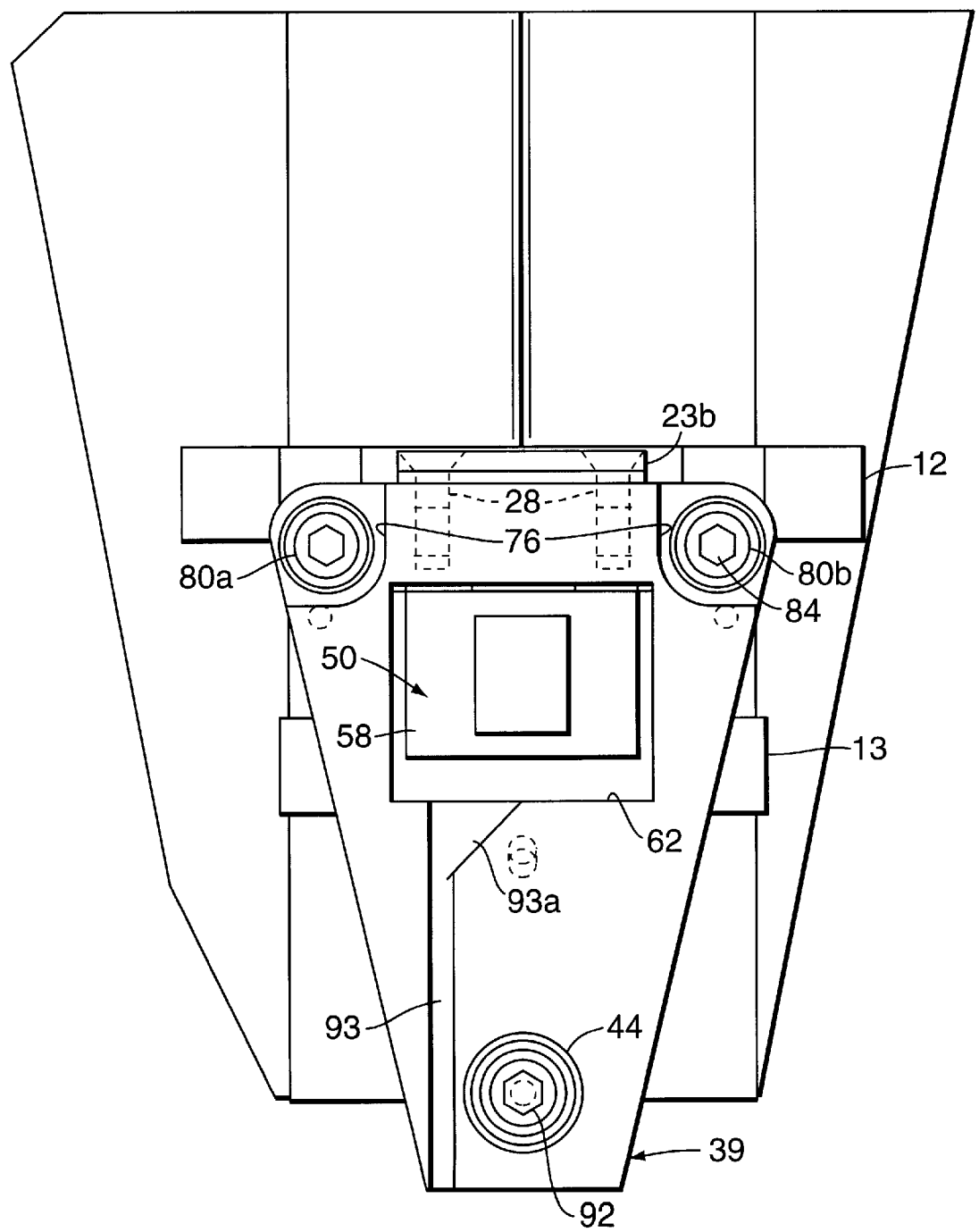
FIG. 3 is a bottom view of the vibratory feeder shown in FIG. 1.

FIG. 3 more clearly illustrates the outside shape from below, of the feeder base casting 39, the through cavity 62, and the slot 93. Also shown in this arrangement are the coil spring isolators 44, 80a, and 80b which are arranged in a triangular pattern. The electromagnet coil assembly 50 is shown suspended within the through cavity 62.

Figure 4:
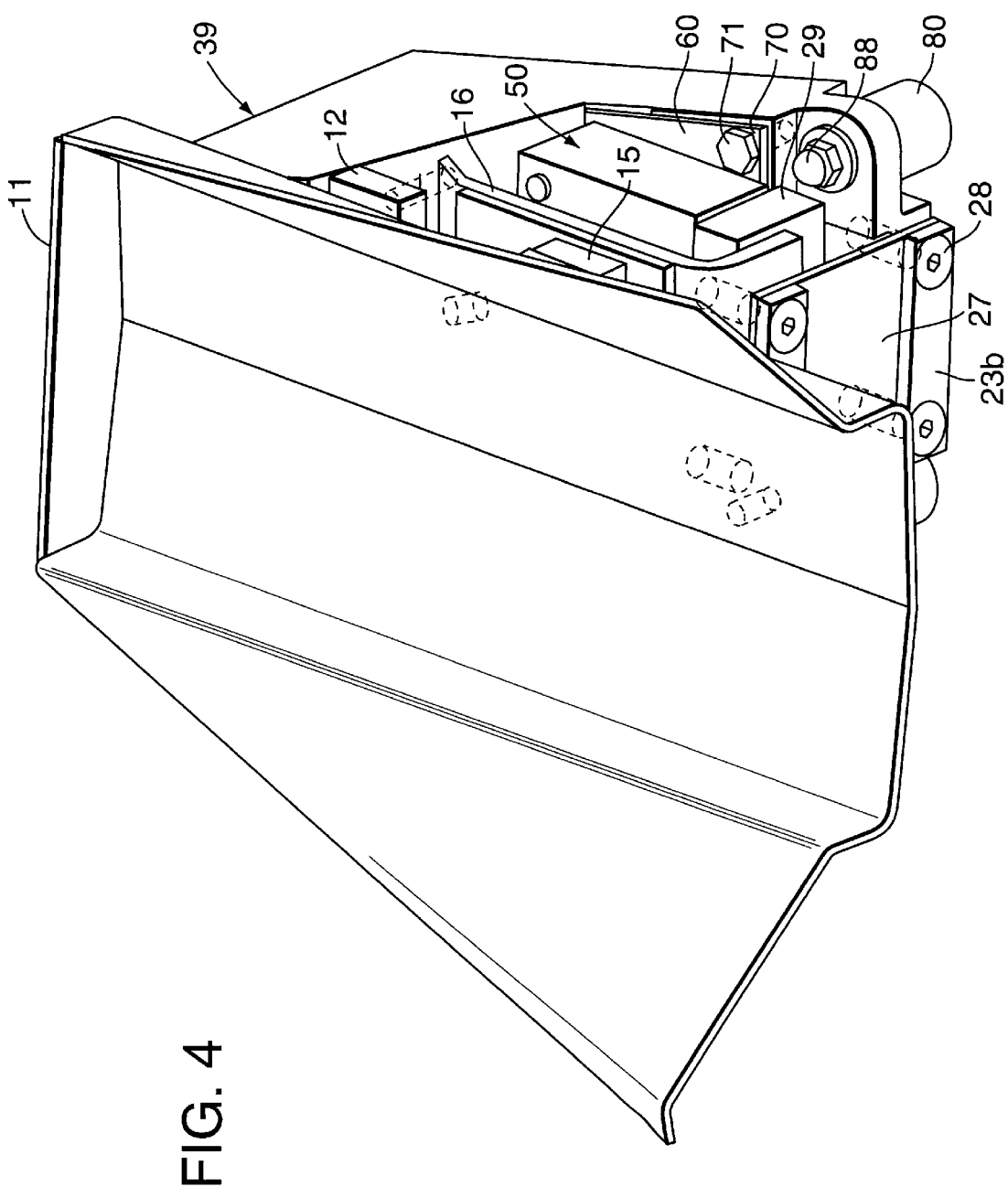
FIG. 4 is a perspective view of the vibratory feeder shown in FIG. 1.

FIG. 4 is a perspective view of the feeder which illustrates the mounting details of the magnet core and coil assembly 50, the magnet mounting/adjustment bracket 60 and the machined, flat surface 70, and the relationship between the magnet core and coil assembly 50 and the face of the magnet armature 29.

Generally, in a vertical packaging/weight scale, ten or more feeder drives are mounted in a circular array forming a ring, with the discharge end of the feeders facing outward from the center of the ring so that material fed from the feeders falls into weigh buckets mounted around a periphery of the ring. Positioned above and over the feeder array is a large inverted cone-shaped chute, so arranged that material, fed into the cone from above, falls down the chute, and drops into the rear of the feeder troughs. One advantage of the present invention is an ability to reduce the overall height of a weigh scale. This is achieved by reducing the mounting dimension of the feeder drive, such that the required number of feeders used in the weigh scale fit in a smaller diameter ring than previous designs. If the feeder array ring can be of a smaller diameter, the base of the cone can be of a smaller diameter and therefore, the height of the cone drops significantly while maintaining a desired slope of the cone wall. If the height of the cone drops, then the overall height of the vertical packaging/weight scale can be reduced. This allows the manufacturer to reduce installation costs, and installation space and allows the manufacturer more flexibility to meet their customers' installation constraints.

As discussed above, the problem with reducing the feeder drive length is the difficulty of obtaining uniform feed rate along the length of the trough, because the center of gravity of the base and trough cannot be aligned easily with the drive force line. In the present invention, two approaches are used to overcome this difficulty. First, while the elastomer spring 35 is at a spring angle of between 10° and 45° and preferably at about 20 degrees to the horizontal, the front leaf spring 27 is mounted in a fixed vertical position. The combined effect produces a dynamic rotation of the trough that opposes the force couple created by the inertial unbalance due to misalignment of the center of gravities of the base and trough. The second step required to assist in this design is to raise and move the center of gravity of the feeder base casting 39 to a rear of the feeder, in the direction that brings the center of gravity closer to alignment, thus aiding in the reduction of the inertia of the force couple. Also, in order to have the feeder drive fit in as tight a ring array as possible, the shape of the feeder base casting 39 is tapered such that it is narrower in the rear than in the front. This results in the feeder base casting shape as depicted in FIGS. 1 and 3 which is high and narrow in the rear, and squat and wider in the front.

It is preferred that the compensation for the inertia force couple be made just enough so that the resulting dynamic feed angle at the discharge of the feeder trough results in a high feed rate while minimizing the impact speed of the material being conveyed. The resultant reduced vertical component also minimizes the amount of dynamic force transmitted though the coil spring isolators 44, 80a, 80b, into the support structure of the scale feeder. The resultant reduced vertical component also lowers the noise level due to material impacting the trough, and other structural noise sources excited at high levels of acceleration, which are further achievements of the invention.

With a feeder so adjusted, the resulting dynamic feed angle in the rear of the feeder trough is higher, resulting in a slightly lower feed rate, but at the same time compensating for possible loss of stroke due to the dampening effect of material load on the rear of the trough. This adjustment also has the desirable effect that the bed depth of material in the rear of the feeder is deeper, because of the lower feed rate, and the bed depth at the discharge end where the feed rate is higher. The reduced bed depth reduces the material losses caused by material dribbling off the trough after the feeder has been turned off due to exceeding the angle of repose of the material, which is less of a problem with lower bed depths.

The results from prototype testing, operating at 3600 vibrations per minute from a 60 Hz power source, and with a stroke of 0.085 inches, indicates that the resultant dynamic feed angle at the trough discharge to be about 12° and at the rear of the trough to be about 25°. Under these conditions, the feed rate at the discharge is in the first stable feed zone, and is calculated to be 78 ft./min. with a material impact speed of 6.4 in./sec., while the feed rate in the rear of the trough is 72 ft./min. In comparison, similar tests run on a competitor's feeder shows that at its spring angle of 45° and a stroke of 0.085 inches, operates in the second stable feed zone, with a calculated feed rate of only 55 ft./min., and material impact speed of 15.1 in./sec., more than double that of the feeder of this invention. Also, for comparison, a typical balance FMC/MHE feeder having a 20° spring angle and a maximum stroke of 0.065 inches, has a calculated feed rate of 52 ft./min., and a material impact speed of 6.9 in./sec. Thus, a high feed rate is obtained with the present invention.

The disadvantageous phenomena known as feeder "coasting" is minimized according to the feeder of the present invention. This reduces the amount of material which discharges from the feeder trough after the feeder is turned off. According to the invention, this has been accomplished by using the combination of the elastomer spring 35, the vertical leaf spring 27, and the horizontally mounted electromagnet 50. The elastomer spring 35, which accounts for between 40% and 80% of total spring rate, represents a significant portion of that required for the entire feeder, resulting in a damping coefficient for the feeder that is more than three times that of competitive feeders of this size and capacity which typically which only use a fiberglass leaf spring design without additional damping devices. As a consequence of the increased damping of the present invention, when the electromagnet 50 is turned off, the feeder stroke dies rapidly, the vertical component of which is largely responsible for the coasting effect problem. The vertical leaf spring 27, by its geometrical orientation minimizes any vertical component to just that caused by the compensated inertial force couple, which further improves the unwanted coasting effect. Finally, since the horizontally mounted electromagnet 50 is so arranged that the pole faces are aligned vertically with, and are parallel to the magnet armature 29, any vertical displacement of the magnet armature 29 would be opposed by the magnetic flux of the electromagnet 50 trying to realign the magnet pole face and armature 29. This also controls unwanted vertical motion at the discharge end of the feeder trough.

While such damping improves the coasting problem, increased damping in the system also means increased energy losses. These losses, coupled with the damping losses from the material load absorbing energy from the system as it is conveyed, require additional power in order to maintain the desired operating stroke $A_r$. Furthermore, if the two-mass feeder is tuned closer to resonance, less power is required to maintain the stroke, but the closer to resonance the feeder is tuned, the less stable the feeder becomes, as its sensitivity to small changes to the mass of the base and trough components, or to the operating power levels, increases dramatically. It is therefore desirable to tune the feeder far enough away from resonance for stable operation, but at a point where the electromagnet 50 can still be of a size proportionate to the size of the feeder, and be of reasonable cost. The horizontally mounted electromagnet 50 design addresses these issues in two ways, the magnet pulls against the vertical spring 27 in the direction where the springs bends easily, thus minimizing force requirements, and adds about 20% more pull area than conventional feeders for increase tractive magnetic force. Also, since the electromagnet 50 requires less air gap to maintain the high feed rate at the shallow effective spring angle, it produces greater tractive force, and uses less power to operate.

Another advantageous feature of the horizontally mounted electromagnet 50 is the ease of adjusting the air gap, since it is not necessary to hold a magnet in place to make the adjustment, as would be required with mounting the magnet at an angle.

In order to facilitate the assembly of the annular elastomer spring assembly 35, into the base casting 39, epoxy glue is spread on the walls of the cavity 38, and on the annular elastomer spring element 36 which has been glued to the hub 35. As well as making an excellent adhesive, the glue acts as a lubricant to facilitate the assembly. When the assembly is pushed into the base casting 39, displaced air is forced through the channels 40, 42, and out of the bottom of the base casting 39, and through the rear isolating cavity 90. Once the annular elastomer spring assembly 35 is in place, the rear isolator 44 is mounted using fastener 92 which seals the channels 40, 42, preventing air to be pumped through channels 40, 42, when the feeder is in operation.

The sealed annular elastomer spring assembly 35, the vertical spring 27, and the horizontally mounted electromagnetic 50, along with the simplicity of the feeder base casting 39, provide an inherently sanitary design compared with competitive designs because there are less pockets for entrapment of articles, or for water collection during washdown.

From the foregoing, it will be observed that numerous modifications and variations can be effected without departing from the true spirit and scope of the novel concept of the present invention. It is to be understood that no limitation with respect to the specific embodiments disclosed herein is intended or should be inferred. The disclosure is intended to cover by the appended claims all such modifications as fall within the scope of the claims.

We claim:

1. A vibratory conveyor, comprising:
   a base having a spring cavity;
   a trough;
   a vibratory drive mounted to said base and operatively connected to said trough to impart vibration thereto;
   a first spring operatively connected to said trough at one end thereof and to said base at an opposite end thereof, said first spring being substantially vertical; and
   a second spring operatively connected at one end to said trough and at a respective opposite end to said bases wherein said second spring is arranged with a longitudinal axis at an oblique angle to horizontal, said longitudinal axis inclined in a direction toward said first spring.

2. The vibratory conveyor according to claim 1, wherein said base has a tapered horizontal profile, tapered in a direction from said first spring toward said second spring.

3. The vibratory conveyor according to claim 1, wherein said vibratory drive comprises an electromagnetic drive with an armature thereof operatively connected to said trough and a coil thereof operatively connected to said base with an air gap arranged therebetween.

4. The vibratory conveyor according to claim 1, wherein said second spring comprises between 40% to 80% of a total spring rate including said first spring and said second spring.

5. The vibratory conveyor according to claim 1, wherein said vibratory driver comprises an electromagnet and an armature which are mounted for a horizontal relative reciprocation direction therebetween.

6. The vibratory conveyor according to claim 1, wherein said angle is between 10° and 45°.

7. The vibratory conveyor according to claim 6, wherein said angle is about 20°.

8. The vibratory conveyor according to claim 1, wherein said first spring comprises a leaf spring and said second spring comprises an elastomer spring.

9. A vibratory conveyor, comprising:
   a base;
   a trough;
   a vibratory drive mounted to said base and connected to said trough to impart vibration thereto;
   a first spring connected to said trough at one end thereof and to said base at an opposite end thereof, said first spring being substantially vertical; and
   a second spring connected at one end to said trough and at a respective opposite end to said base where said second spring is arranged with a spring axis at an angle to horizontal; and
   wherein said second spring comprises a hub operatively connected to said trough and an elastomer ring surrounding and adhesively affixed to said hub, and said base includes a cavity with a sidewall that at least partially defines said cavity, said elastomeric spring being adhesively secured around an outer circumference thereof to the sidewall of said cavity.

10. A vibratory feeder comprising:
    a base having a cavity;
    a trough located above said base;
    a first spring arranged between said base and said trough, supporting said trough from said base;
    a second spring operatively connected to said trough and to said base and arranged at an angle to the horizontal, inclined toward said first spring;

an electromagnet mounted adjustably within said cavity and having vertical pole face, and exerting a horizontal magnetic force, said electromagnet connected for movement with said base;

an armature having a vertical face separated from said pole face by an air gap, said armature operatively connected to said trough for movement therewith; and a substantially L-shaped spring mounting bracket connected to said trough and having a vertical leg, and said first spring comprises a vertically arranged leaf connected to said vertical leg of said bracket, and said second spring connected to said horizontal leg of said bracket.

11. The feeder according to claim 10 wherein said base comprises an upstanding L shape with a bottom leg and an upstanding leg, and said cavity is through said bottom leg, and said second spring is connected to said upstanding leg.

12. The feeder according to claim 11 wherein said upstanding leg comprises a spring cavity into a front facing surface thereof, said second spring comprising an elastomeric body cemented into said spring cavity.

13. The feeder according to claim 12, wherein said front facing surface inclined at between 10° to 45° to the vertical, said cavity extending perpendicularly thereto.

14. A vibratory feeder comprising:

a base having a cavity;

a trough located above said base;

a first spring arranged between said base and said trough, supporting said trough from said base;

a second spring operatively connected to said trough and to said base and arranged at an angle to the horizontal, inclined toward said first spring;

an electromagnet mounted adjustably within said cavity and having vertical pole face, and exerting a horizontal magnetic force, said electromagnet connected for movement with said base;

an armature having a vertical face separated from said pole face by an air gap, said armature operatively connected to said trough for movement therewith; and wherein said trough has a front, material discharge end and a closed back end and said base is tapered in plan view in a direction defined from said front, material discharge end back toward said closed back end.

15. The feeder according to claim 14 wherein said electromagnet is supported by a plate connected thereto and adjustably fastened to said base.

16. A vibratory conveyor, comprising:

a base;

a trough;

a vibratory drive mounted to said base and operatively connected to said trough to impart vibration thereto;

a first spring operatively connected to said trough at one end thereof and to said base at an opposite end thereof, said first spring being substantially vertical; and a second spring operatively connected at one end to said trough and at a respective opposite end to said base wherein said second spring is arranged with a longitudinal axis at an oblique angle to horizontal, said longitudinal axis inclined in a direction toward said first spring, wherein said second spring comprises an elastomeric mass and said spring force is directed along its longitudinal axis.

17. The conveyor according to claim 16 wherein said second spring is arranged at 10° to 45° to the horizontal.

18. The conveyor according to claim 16 wherein said second spring comprises about between 40–80% of a total spring rate including the first and second springs.

19. The vibratory conveyor according to claim 16, wherein said second spring comprises a hub connected to said trough and an elastomer ring surrounding and adhesively affixed to said hub, and said base includes a spring cavity at least partially defined by a sidewall, said elastomeric spring being adhesively secured around an outer circumference thereof to the sidewall of said spring cavity.

20. The vibratory conveyor according to claim 19, wherein said second spring comprises between 40% to 80% of a total spring rate including said first spring and said second spring.

21. The vibratory conveyor according to claim 20, wherein said angle is between 10° and 45°.

22. The vibratory conveyor according to claim 16, wherein said first spring comprises a leaf spring.

* * * * *

UNITED STATES PATENT AND TRADEMARK OFFICE
CERTIFICATE OF CORRECTION

PATENT NO.:     5,967,294

DATED :         October 19, 1999

INVENTOR(S):    Harold E. Patterson et al.

It is hereby certified that error appear(s) in the above-identified patent and that said Letters Patent is hereby corrected as shown below:

Title Page, left column, under References Cited, U.S. Patent Documents, please add:
| | | | |
|---|---|---|---|
| 1,672,807 | 06/1928 | Etzel | 198/769 |
| 3,542,186 | 11/1970 | Allen et al. | 198/763 |
| 3,703,233 | 11/1972 | Hacker | 198/763 |
| 3,729,090 | 04/1973 | Hacker | 198/763 |
| 3,954,169 | 05/1976 | Clark | 198/760 |
| 4,795,025 | 01/1989 | Doke et al. | 198/763 |
| 5,664,664 | 09/1997 | Gaines | 198/769 |
| 5,757,092 | 05/1998 | Graham | 198/769 |

Title Page, left column, under References Cited, Foreign Patent Documents, please add:
| | | | | |
|---|---|---|---|---|
| 722,816 | 03/1980 | SU | Stroganov | 198/769 |
| 2,157,395 | 10/1985 | GB | Eardley | 198/763 |
| 404153119A | 05/1992 | JP | Doke | 198/769 |

In column 2, line 11, "$A_6$" should be --$A_t$;--

Signed and Sealed this

Fifth Day of September, 2000

Attest:

Q. TODD DICKINSON

*Attesting Officer*     *Director of Patents and Trademarks*